(12) United States Patent
Li et al.

(10) Patent No.: US 9,188,145 B2
(45) Date of Patent: Nov. 17, 2015

(54) BOARD ASSEMBLY WITH LOCK MEMBERS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Guang-Long Li, Shenzhen (CN); Ming-Chang Lee, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/468,046

(22) Filed: Aug. 25, 2014

(65) Prior Publication Data

US 2015/0063950 A1 Mar. 5, 2015

(30) Foreign Application Priority Data

Aug. 29, 2013 (CN) .......................... 2013 1 0383179

(51) Int. Cl.
*F16B 21/04* (2006.01)
*F16B 5/10* (2006.01)

(52) U.S. Cl.
CPC .. *F16B 21/04* (2013.01); *F16B 5/10* (2013.01)

(58) Field of Classification Search
CPC .................................. F16B 5/10; F16B 21/04

USPC .......................................... 411/319, 549, 553
See application file for complete search history.

(56) References Cited

U.S. PATENT DOCUMENTS

| 2,309,737 | A | * | 1/1943 | Murphy ......................... | 411/549 |
|---|---|---|---|---|---|
| 2,373,722 | A | * | 4/1945 | Von Opel ....................... | 411/349 |
| 2,476,339 | A | * | 7/1949 | Von Opel ....................... | 411/349 |
| 2,477,178 | A | * | 7/1949 | Lay ................................ | 411/551 |
| 3,209,425 | A | * | 10/1965 | Barry et al. ................... | 411/337 |
| 3,777,639 | A | * | 12/1973 | Lange ........................... | 396/541 |
| 3,811,157 | A | * | 5/1974 | Schenk ......................... | 411/349 |
| 3,816,882 | A | * | 6/1974 | Maeda et al. ................. | 411/549 |
| 6,397,499 | B1 | | 6/2002 | Savoie | |
| 7,537,409 | B2 | * | 5/2009 | Huhnerbein .................. | 403/348 |
| D679,170 | S | * | 4/2013 | Else .............................. | D8/349 |
| 2005/0220568 | A1 | * | 10/2005 | Fink .............................. | 411/553 |

\* cited by examiner

*Primary Examiner* — Flemming Saether
(74) *Attorney, Agent, or Firm* — Novak Druce Connolly Bove + Quigg LLP

(57) ABSTRACT

An assembly of boards includes a first board, a second board and a lock member. The first board includes a first through hole and a gap formed on a bottom of the first board. The second board includes a supporting wall formed on a bottom thereof, a second through hole corresponding to the first through hole, and a receiving hole defined in the first board and communicating with the second through hole. The lock member includes a head rotatably received in the receiving hole and being blocked by the supporting wall, a neck connected to the head, and a latch portion formed on the neck, the latch portion extending through the first and second through holes and able to be rotatably abutted so as to latch against the bottom of the first board.

6 Claims, 7 Drawing Sheets

BOARD ASSEMBLY WITH LOCK MEMBERS

FIELD

The subject matter herein generally relates to fastener technology.

BACKGROUND

Usually one or more screws or other mechanical fasteners fix separate boards or other objects together.

BRIEF DESCRIPTION OF THE DRAWINGS

Implementations of the present technology will now be described, by way of example only, with reference to the attached figures.

DETAILED DESCRIPTION

Figure 1:
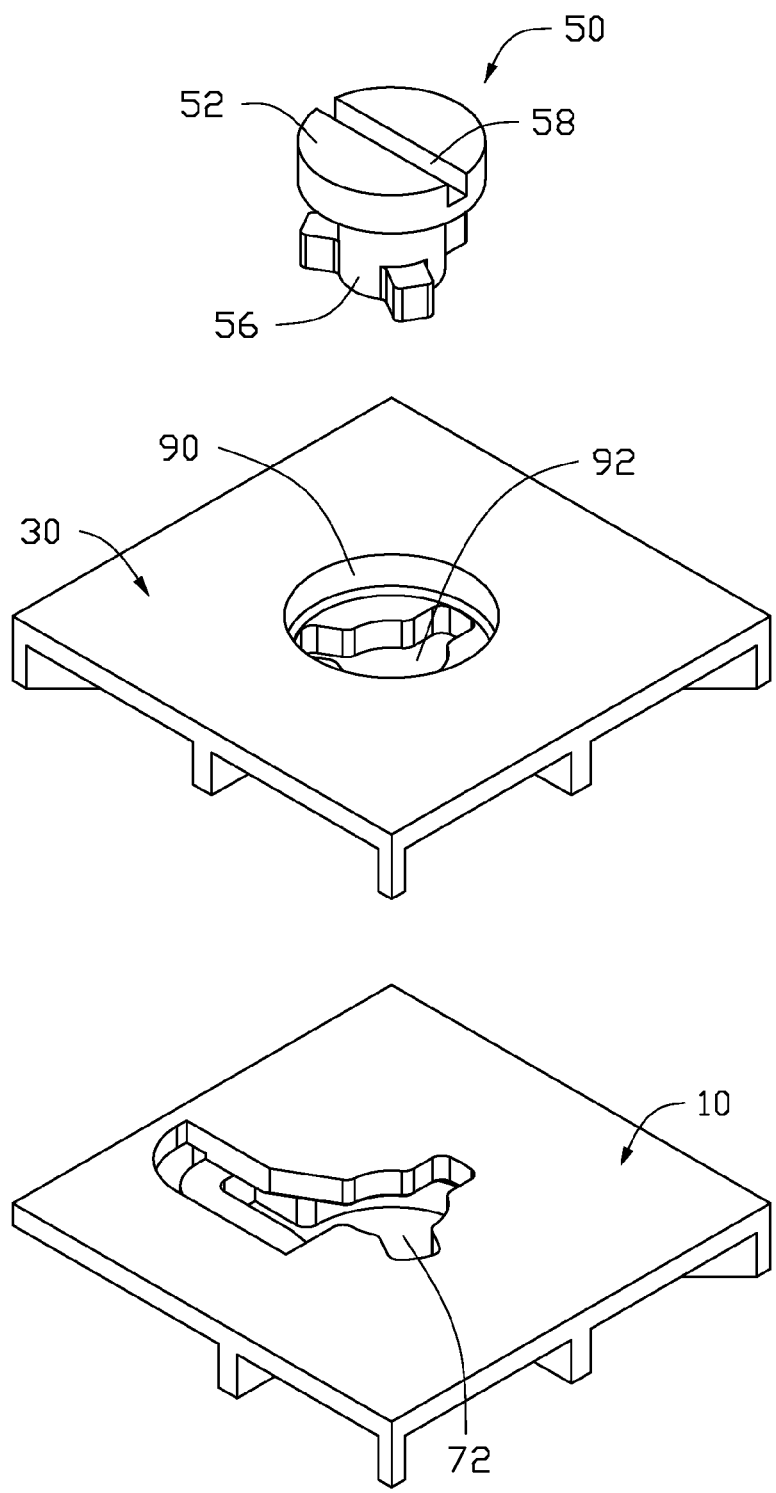
FIG. 1 is an exploded, isometric view of an embodiment of a board assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a locking apparatus for locking two boards or plates or other flat objects together.

Figure 2:
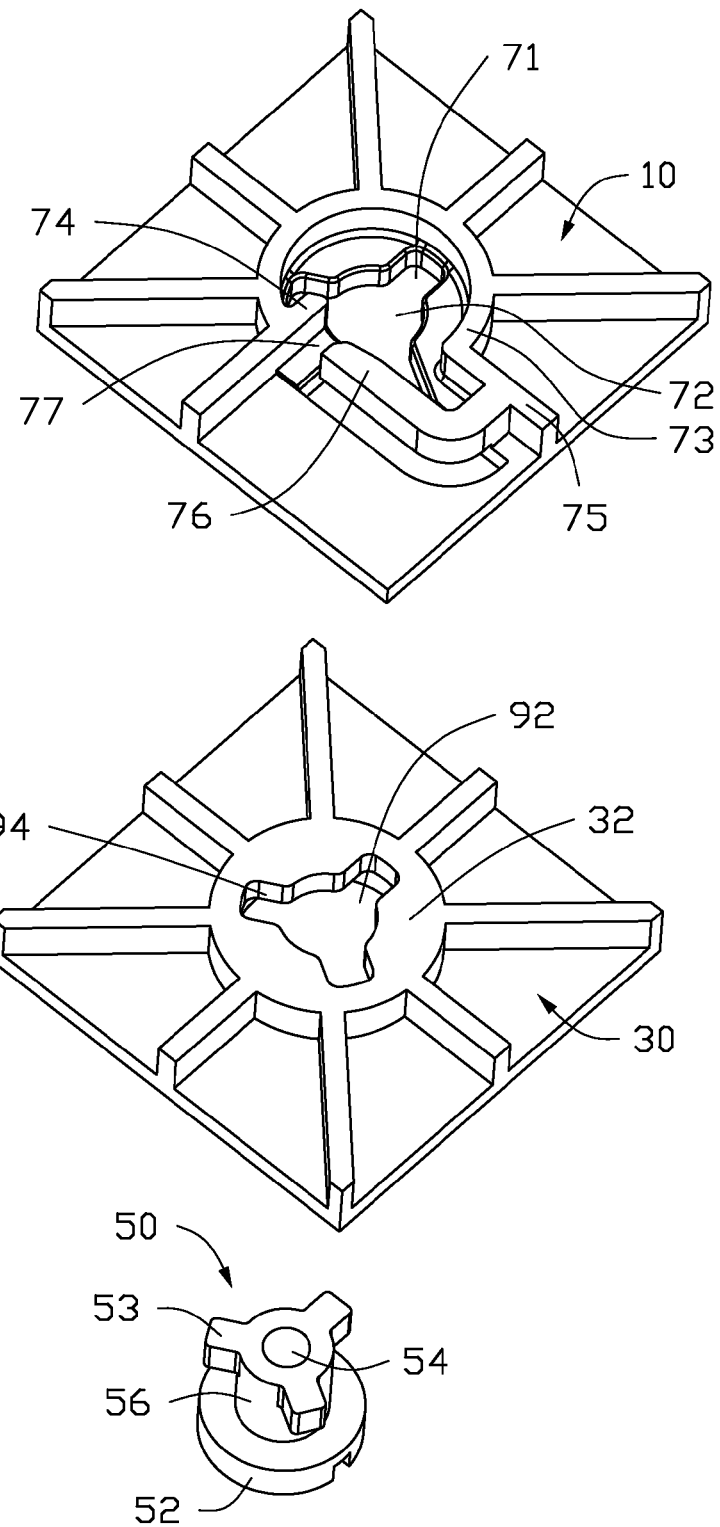
FIG. 2 is similar to FIG. 1, but viewed from another angle.
Figure 3:
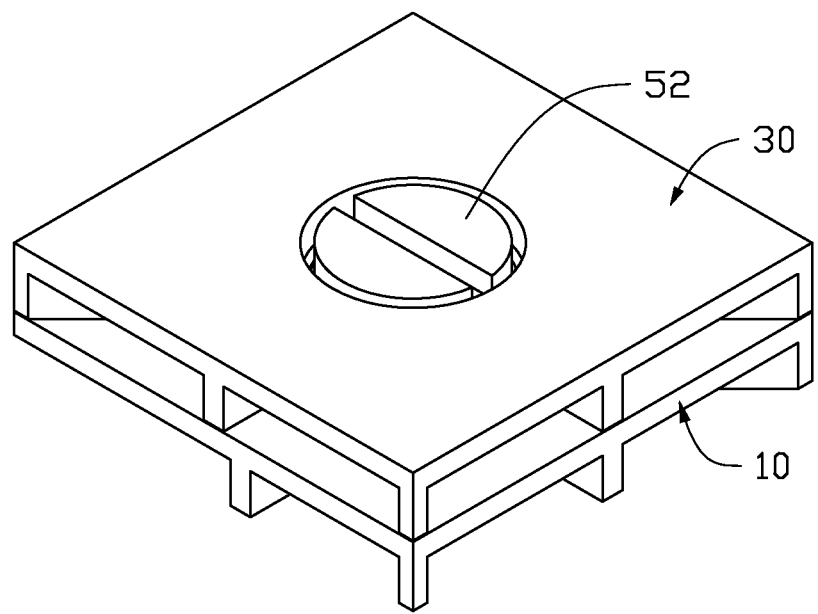
FIG. 3 is an assembled, isometric view of the board assembly of FIG. 1.
Figure 4:
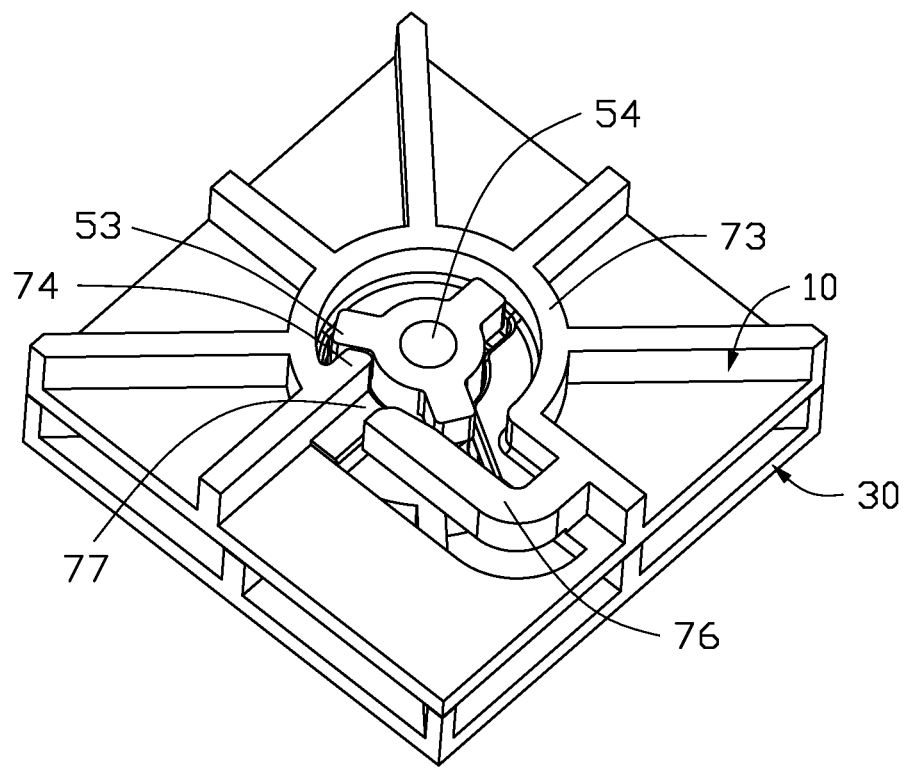
FIG. 4 is an assembled, isometric view of FIG. 2, showing the board assembly released.
Figure 5:
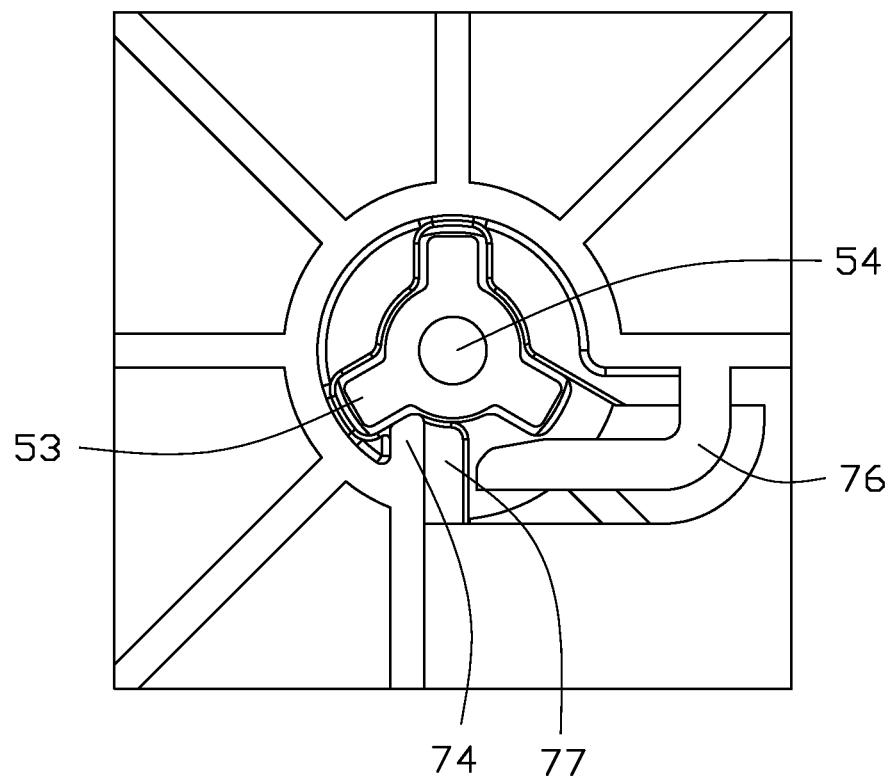
FIG. 5 is a top elevational view of the board assembly of FIG. 4.
Figure 6:
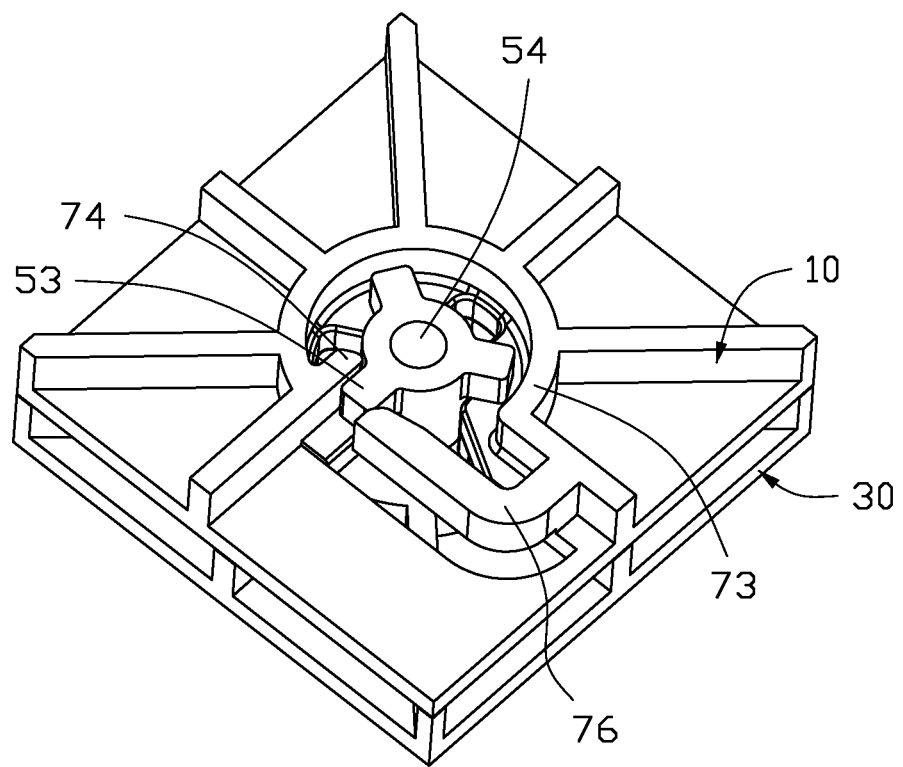
FIG. 6 is similar to FIG. 4, showing the board assembly latched.
Figure 7:
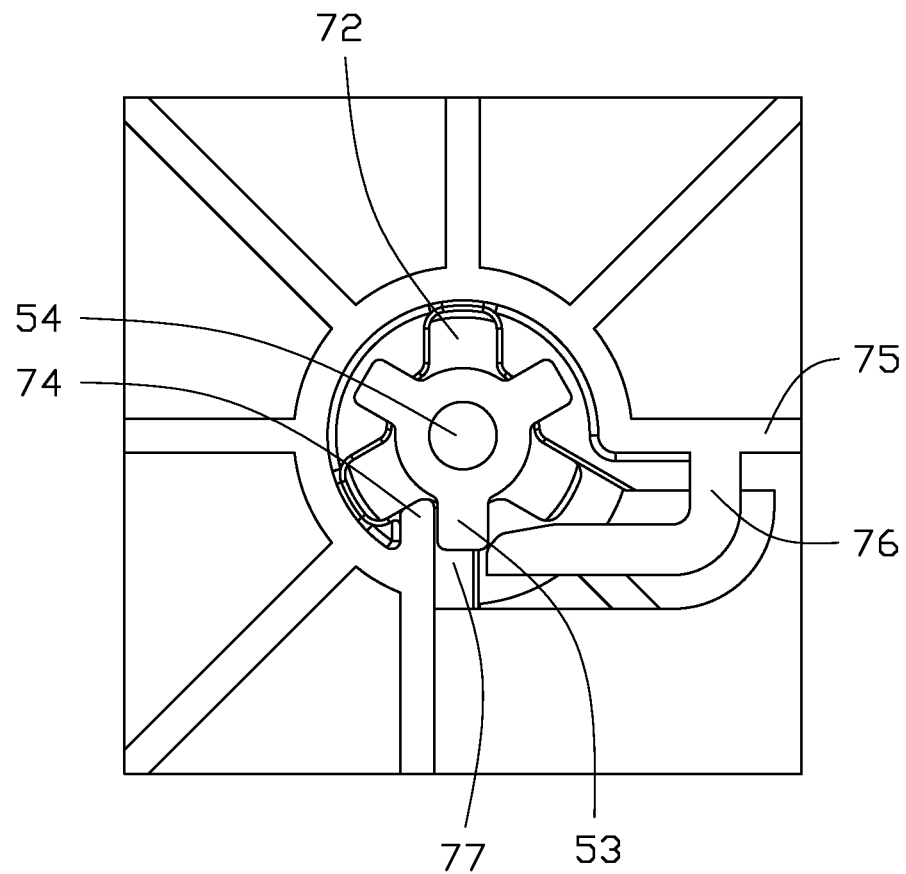
FIG. 7 is a top elevational view of the board assembly of FIG. 6.

FIGS. 1 and 2 illustrate an embodiment of a board assembly. The board assembly includes a first board 10, a second board 30, and a lock member 50.

The lock member 50 includes a cylindrical head 52 and a cylindrical neck 56 connected to the head 52. The head 52 defines a slot 58 in a top wall thereof. A latch portion 54 is formed at a distal end of the neck 56 and includes a plurality of blocks 53 extending radially, evenly spaced from the circumference of the neck 56. In this example, the plurality of blocks are evenly spaced, but in other embodiments, the plurality of blocks can be spaced, sized, or arranged in any suitable configuration. In the embodiment, the latch portion 54 includes three blocks 53.

The first board 10 includes a through hole 72 defined therein. A C-shaped annular frame 73 is formed on a bottom of the first board 10, surrounding the through hole 72. Two bars 74 and 75 extend from respective ends of the frame 73, and an L-shaped blocking portion 76 extends from the bar 75. The bars 74 and 75 extend radially substantially from the center of the frame 73. The blocking portion 76 is at the bottom of the first board 10. A gap 77 is defined between the bar 74 and a distal end of the blocking portion 76. The through hole 72 includes a plurality of evenly spaced extension slots 71 around a center of the through hole 72. In the embodiment, the through hole 72 includes three extension slots 71.

The second board 30 includes a supporting wall 32 formed on a bottom of the second board 30. A receiving hole 90 is defined in the second board 30. A through hole 92 is defined in the supporting wall 32 to communicate with the receiving hole 90. The through hole 92 includes a plurality of evenly spaced extension slots 94 about a center of the through hole 92. In the embodiment, the through hole 92 includes three extension slots 94.

Referring to FIGS. 3-7, in assembly, the second board 30 is placed on the first board 10, with the supporting wall 32 contacting the first board 10 and the through hole 92 in alignment with the through hole 72. The head 52 is received in the receiving hole 90. The neck 54 extends through the through hole 92 and the through hole 72, with the blocks 53 extending through the extension slots 94 and the extension slots 71. Then, the lock member 50 is rotated to latch one of the blocks 53 in the gap 77 and the other blocks 53 are blocked by the bottom of the first board 10. Thus, the first board 10 and second board 30 are fastened together.

In disassembly, the lock member 50 is reversely rotated to allow the blocks 53 to be in alignment with the extension slots 94 and the extension slots 71, to withdraw the corresponding blocks 53 from the gap 77. Then the lock member 50 can be detached from the first board 10 and second board 30.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A board assembly comprising:
   a first board comprising a first through hole defined therein and a gap formed on a bottom of the first board, wherein a C-shaped annular frame extends from the bottom of the first board and surrounds the first through hole, two bars extends from respective ends of the frame, a blocking portion extending from one bar, the gap is formed between the distal end of the blocking portion and the other bar;
   a second board comprising a supporting wall formed on a bottom thereof, a second through hole defined in the supporting wall and corresponding to the first through hole, and a receiving hole defined in the second board and communicated with the second through hole; and a lock member comprising a head rotatably received in the receiving hole and blocked by the supporting wall, a neck connected to the head, and a latch portion formed on the neck, the neck extending through the first and second through holes, and the latch portion rotatably abutting against the bottom of the first board and latched in the gap.

2. The board assembly of claim 1, wherein the neck is cylindrical, the latch portion comprises a plurality of blocks extending from a circumference of the neck, each of the first and second through holes comprises a plurality of extension slots for respectively receiving the blocks.

3. The board assembly of claim 1, wherein the bars are extending radially from the center of the frame.

4. The board assembly of claim 1, wherein the blocking portion is L-shaped.

5. The board assembly of claim 1, wherein the blocking portion is at the bottom of the first board.

6. The board assembly of claim 1, wherein the head of the lock member defines a slot in a top wall thereof.

\* \* \* \* \*